United States Patent
Xiao

(10) Patent No.: US 11,304,206 B2
(45) Date of Patent: Apr. 12, 2022

(54) RAPID DETERMINATION OF AN ANTENNA PATTERN

(71) Applicant: ARRIS Enterprises LLC, Suwanee, GA (US)

(72) Inventor: Shuai Xiao, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/077,777

(22) Filed: Oct. 22, 2020

(65) Prior Publication Data
US 2021/0045128 A1    Feb. 11, 2021

Related U.S. Application Data

(63) Continuation of application No. 16/290,218, filed on Mar. 1, 2019, now Pat. No. 10,849,132.

(51) Int. Cl.
*H04W 72/08*    (2009.01)
*H04W 16/28*    (2009.01)
(Continued)

(52) U.S. Cl.
CPC ......... *H04W 72/082* (2013.01); *H04W 16/28* (2013.01); *H04W 72/0446* (2013.01); *H04W 84/12* (2013.01)

(58) Field of Classification Search
CPC .............. H04W 72/082; H04W 16/28; H04W 72/0446; H04W 84/12; H04B 7/0695
See application file for complete search history.

(56) References Cited

U.S. PATENT DOCUMENTS

| 6,085,076 A * | 7/2000 | Lindsay ............... H04B 7/0604 455/133 |
| 2008/0248802 A1* | 10/2008 | Krishnamoorthy .. H04B 7/0689 455/445 |

(Continued)

FOREIGN PATENT DOCUMENTS

KR    0432976 A    5/2004

OTHER PUBLICATIONS

PCT International Search Report and Written Opinion, PCT/US2020/20705, dated May 14, 2020.

*Primary Examiner* — Mohamed A Kamara
(74) *Attorney, Agent, or Firm* — Steven Stupp; Stewart Wiener

(57) ABSTRACT

An electronic device that determines one or more antenna patterns is described. During operation, this electronic device may reserve N time slots in a communication channel. Then, the electronic device may provide predefined frames in the N time slots that are intended for the second electronic device, where each time slot is associated with a different antenna pattern of an antenna. For example, the predefined frames may include null data packets (NDPs), and the time slot may have an extremum value of a performance metric, such as a signal-to-noise ratio. Moreover, the electronic device may receive feedback associated with the second electronic device, where the feedback includes information specifying at least a time slot in the N time slots. Next, the electronic device may select, based at least in part on the feedback, an antenna pattern associated with the time slot for use when communicating with the second electronic device.

20 Claims, 9 Drawing Sheets

(51) Int. Cl.
*H04W 72/04* (2009.01)
*H04W 84/12* (2009.01)

(56) References Cited

U.S. PATENT DOCUMENTS

| | | | |
|---|---|---|---|
| 2011/0110340 A1* | 5/2011 | Lakkis | H04W 72/0446 370/336 |
| 2013/0059619 A1 | 3/2013 | Kim | |
| 2018/0234159 A1 | 8/2018 | Xiao et al. | |

* cited by examiner

RAPID DETERMINATION OF AN ANTENNA PATTERN

CROSS REFERENCE TO RELATED APPLICATIONS

This application is a continuation of U.S. patent Ser. No. 16/290,218, "Rapid Determination of an Antenna Pattern," by Shuai Xiao, filed on Mar. 1, 2019, the contents of which are herein incorporated by reference.

BACKGROUND

Field

The described embodiments relate to techniques for determining one or more antenna patterns.

Related Art

Many electronic devices are capable of wirelessly communicating with other electronic devices. For example, these electronic devices can include a networking subsystem that implements a network interface for: a cellular network (UMTS, LTE, etc.), a wireless local area network, e.g., a wireless network such as described in the Institute of Electrical and Electronics Engineers (IEEE) 802.11 standard (which is sometimes referred to as 'Wi-Fi', from the Wi-Fi Alliance of Austin, Tex.), Bluetooth™ (from the Bluetooth Special Interest Group of Kirkland, Wash.), and/or another type of wireless network.

During Wi-Fi communication, there may be crosstalk or interference from other electronic devices in proximity. In addition, in a dynamic communication environment, the communication path between electronic devices may vary as a function of time. In order to address these problems, some access points use electronic-device-specific antenna patterns during transmit and/or receive.

However, it can be difficult and time consuming to determine the appropriate antenna pattern to use during communication with a particular electronic device. Moreover, existing approaches for determining an antenna pattern often involve back-and-forth communication (e.g., the exchange of multiple packets or frames) between an access points and associated electronic devices in a wireless local area network (WLAN). This can increase the overhead in the WLAN. Consequently, the difficulties in determining antenna patterns can degrade the performance during Wi-Fi communication.

SUMMARY

An electronic device that determines an antenna pattern is described. This electronic device may include an antenna and an interface circuit that wirelessly communicates with a second electronic device. During operation, the electronic device may reserve N time slots in a communication channel. Then, the electronic device may provide, from the interface circuit, predefined packets or frames in the N time slots that are intended for at least the second electronic device, where each time slot is associated with a different antenna pattern of the antenna. Moreover, the electronic device may receive, at the interface circuit, feedback associated with the second electronic device, where the feedback includes information specifying at least a time slot in the N time slots. Next, the electronic device may select, based at least in part on the feedback, the antenna pattern associated with the time slot for use when communicating with the second electronic device.

Note that the N time slots may be consecutive.

Moreover, the predefined packets or frames may include null data packets (NDPs).

Furthermore, the time slot may have an extremum value of a performance metric. For example, the performance metric may include a signal-to-noise ratio.

Additionally, the information may specify a set of ranked time slots. For example, the set of time slots may be ranked based at least in part on performance metrics associated with the time slots, where a given performance metric may include: a signal-to-noise ratio, an angle of arrival or both.

In some embodiments, the feedback includes a feedback frame.

Note that the electronic device may include an access point.

Moreover, the interface circuit may wirelessly communicate with a third electronic device. Then, during operation, the electronic device may: receive, at the interface circuit, second feedback associated with the third electronic device, where the second feedback comprises information specifying at least a second time slot in the N time slots; and select, based at least in part on the second feedback, a second antenna pattern associated with the second time slot for use when communicating with the third electronic device.

Note that the feedback and the second feedback may include different feedback frames. Alternatively or additionally, the feedback and the second feedback may be conveyed in different sub-channels in a feedback frame.

Furthermore, the electronic device may serially provide, from the interface circuit, polling information intended for the second electronic device and second polling information intended for the third electronic device. Alternatively, the electronic device may provide, from the interface circuit, a trigger frame intended for the second electronic device and the third electronic device, where the feedback and the second feedback are received concurrently in different sub-channels in a feedback frame.

In some embodiments, the electronic device may select, based at least in part on the feedback and the second feedback, a common antenna pattern for use when communicating jointly with the second electronic device and the third electronic device.

Another embodiment provides a computer-readable storage medium for use with the electronic device. This computer-readable storage medium may include program instructions that, when executed by the electronic device, cause the electronic device to perform at least some of the aforementioned operations.

Another embodiment provides a method for determining an antenna pattern. This method includes at least some of the operations performed by the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
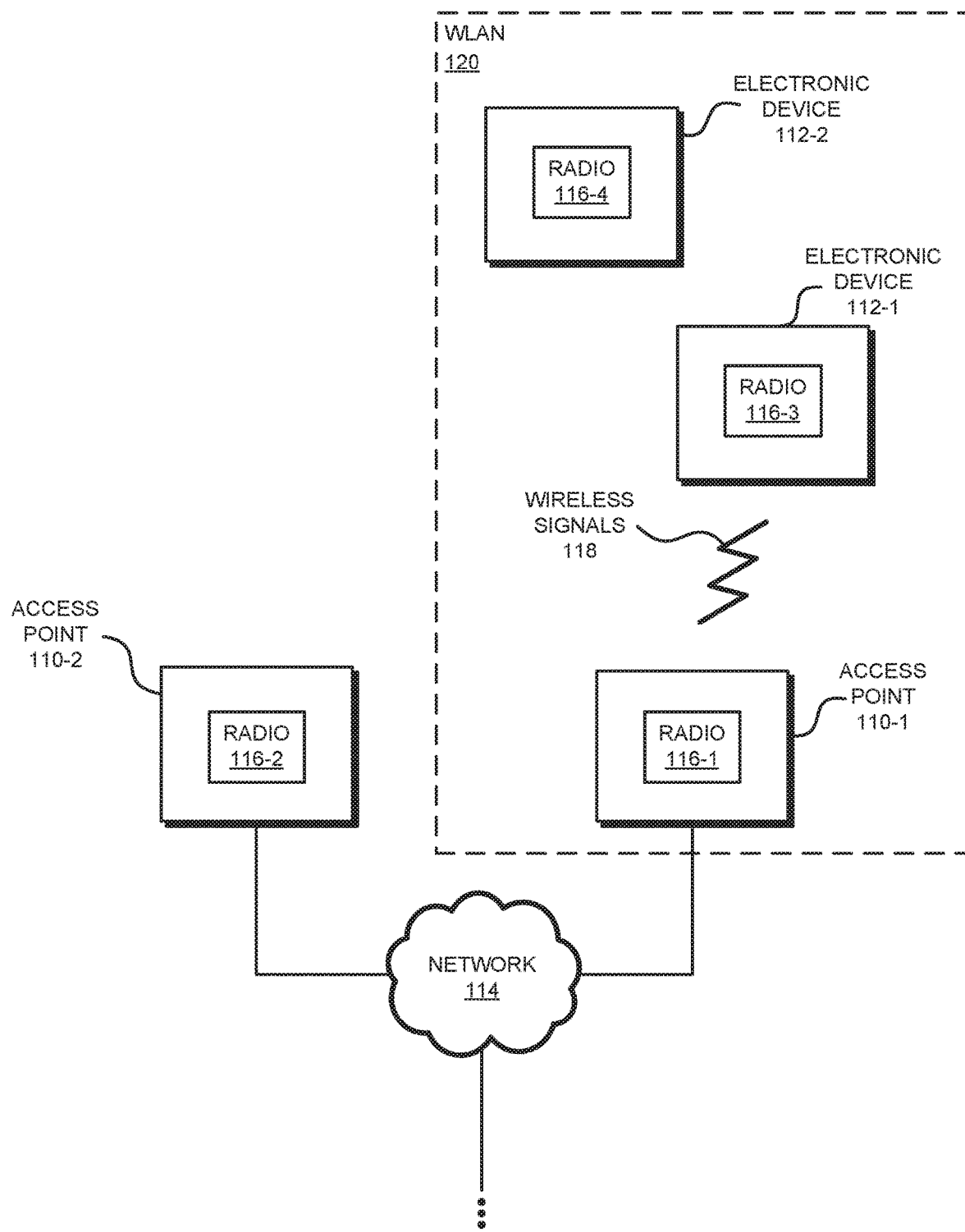
FIG. 1 is a block diagram illustrating an example of a system in accordance with an embodiment of the present disclosure.

An electronic device that determines one or more antenna patterns is described. During operation, this electronic device may reserve N time slots in a communication channel. Then, the electronic device may provide predefined packets or frames in the N time slots that are intended for at least the second electronic device, where each time slot is associated with a different antenna pattern of an antenna. For example, the predefined packets or frames may include null data packets (NDPs), and the time slot may have an extremum value of a performance metric, such as a signal-to-noise ratio. Moreover, the electronic device may receive feedback associated with the second electronic device, where the feedback includes information specifying at least a time slot in the N time slots. Next, the electronic device may select, based at least in part on the feedback, an antenna pattern associated with the time slot for use when communicating with the second electronic device.

In some embodiments, the electronic device may receive second feedback associated with a third electronic device, where the second feedback includes information specifying at least a second time slot in the N time slots. Then, based at least in part on the second feedback, the electronic device selects a second antenna pattern associated with the second time slot for use when communicating with the third electronic device. Alternatively or additionally, the electronic device may select, based at least in part on the feedback and the second feedback, a common antenna pattern for use when communicating jointly with the second electronic device and the third electronic device.

By using the predefined packets or frames in the N time slots to rapidly probe the performance of different antenna patterns, this communication technique may improve the communication performance of the electronic device. For example, the communication technique may reduce the time and the communication overhead needed to determine the one or more antenna patterns. In some embodiments, the one or more antenna patterns may be determined in, e.g., 5× less time than in other approaches (such as those based on throughput). Moreover, the communication technique may reduce crosstalk or interference when the electronic device communicates with one or more electronic devices, such as the second electronic device and/or the third electronic device. Consequently, the communication technique may improve the user experience, and thus may improve customer satisfaction and retention.

In the discussion that follows, the electronic device may include a portable electronic device (such as a cellular telephone) or an access point that communicates frames or packets in accordance with a wireless communication protocol, such as an Institute of Electrical and Electronics Engineers (IEEE) 802.11 standard, Bluetooth, and/or another type of wireless interface. In the discussion that follows, Wi-Fi is used as an illustrative example. However, a wide variety of communication protocols may be used, such as Long Term Evolution or LTE (from the 3rd Generation Partnership Project of Sophia Antipolis, Valbonne, France), LTE Advanced (or LTE-A), a third generation or 3G communication protocol, a fourth generation or 4G communication protocol, a fifth generation or 5G communication protocol, or other present or future developed advanced cellular communication protocol, etc.

Moreover, the access point may communicate with other access points and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among one or more access points 110 and one or more electronic devices 112 (such as a cellular telephone) in accordance with some embodiments. Notably, access points 110 may communicate with each other using wireless and/or wired communication. Note that access points 110 may include a physical access point and/or a virtual access point that is implemented in software in an environment of an electronic device or a computer. In addition, access points 110 may communicate with electronic devices 112 using wireless communication.

The wired communication among access points 110 may occur via network 114 (such as an intra-net, a mesh network, point-to-point connections and/or the Internet) and may use a network communication protocol, such as Ethernet. Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, wireless communication among access points 110 also involves the use of dedicated connections, such as via a peer-to-peer (P2P) communication technique.

Figure 9:
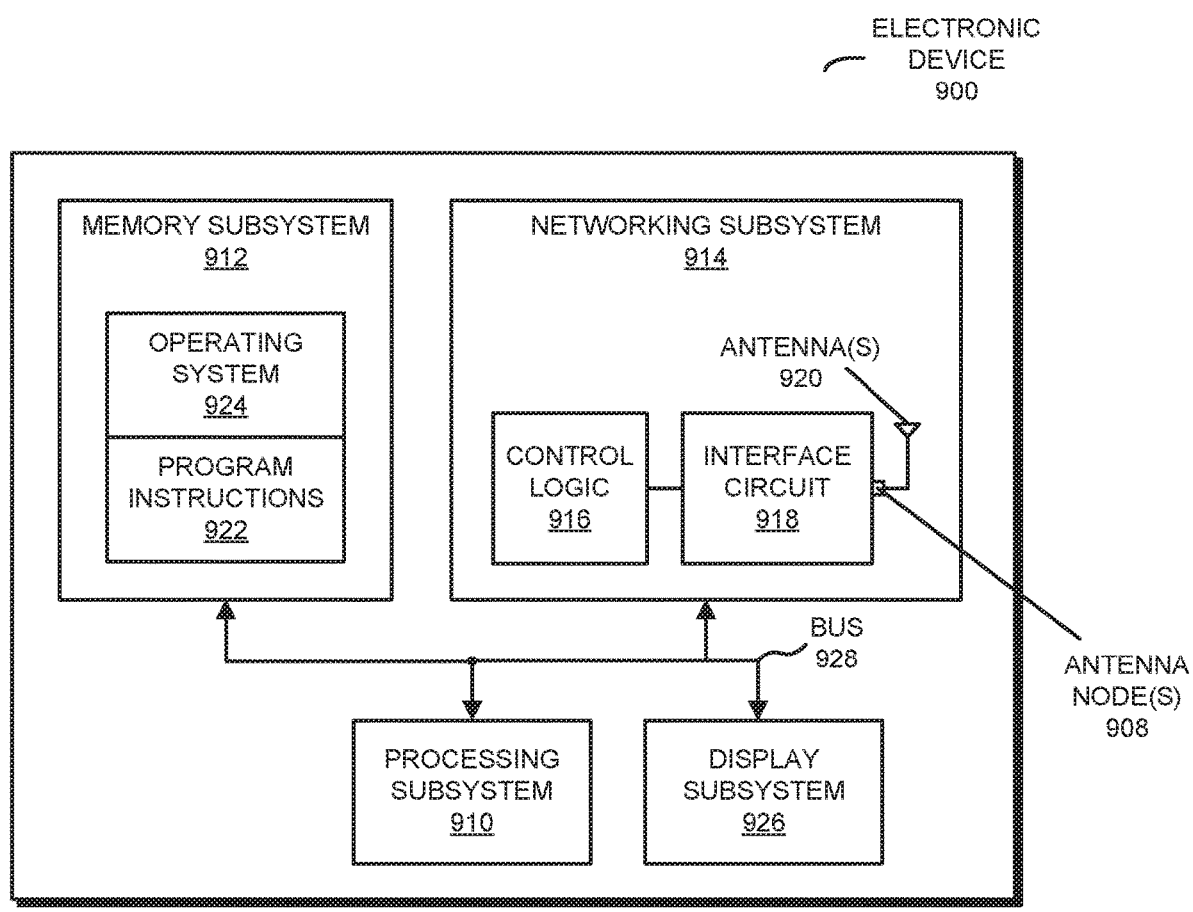
FIG. 9 is a block diagram illustrating an example of an electronic device in accordance with an embodiment of the present disclosure.

As described further below with reference to FIG. 9, access points 110 and/or electronic devices 112 may include subsystems, such as a networking subsystem, a memory subsystem and a processor subsystem. In addition, access points 110 and electronic devices 112 may include radios 116 in the networking subsystems (which may include at least some of the functionality in an access-point module). More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 116 are shown in access points 110 and electronic devices 112, one or more of these instances may be different from the other instances of radios 116.

As can be seen in FIG. 1, wireless signals 118 (represented by a jagged line) are transmitted from radio 116-1 in access point 110-1. These wireless signals may be received by radio 116-3 in electronic device 112-1. In particular, access point 110-1 may transmit frames or packets. In turn, these frames or packets may be received by electronic device 112-1. Moreover, access point 110-1 may allow electronic device 112-1 to communicate with other electronic devices, computers and/or servers via network 114.

Note that the communication among access points 110 and/or with electronic devices 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments, processing a packet or frame in access points 110 and electronic devices 112 includes: receiving wireless signals 118 with the packet or frame; decoding/extracting the packet or frame from received wireless signals 118 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As described further below with reference to FIGS. 2-4 and 6-8, the communication technique may be performed by a given one of access points 110 (such as access point 110-1) or a given one of electronic devices 112 (such as electronic device 112-1). (Note that electronic devices 112 are sometimes referred to as 'clients,' 'stations' or 'recipient electronic devices' in WLAN 120.) Using access point 110-1 as an illustration, access point 110-1 may efficiently (e.g., with reduced communication overhead) and rapidly determine one or more antenna patterns. Notably, access point 110-1 may reserve N time slots in a communication channel, such as, e.g., between 4 and 32 time slots. For example, the N time slots may be consecutive or adjacent time slots. Then, access point 110-1 may provide or transmit predefined packets or frames (such as NDPs) in the N time slots that are intended for or are to at least one of electronic devices (such as electronic device 112-1), where each time slot is associated with a different antenna pattern of an antenna in or associated with access point 110-1. Moreover, access point 110-1 may receive feedback (such as a feedback frame) associated with or from electronic device 112-1, where the feedback includes information specifying at least a time slot in the N time slots (such as time slot 3). For example, electronic device 112-1 may report the information for a time slot that has a maximum or largest signal-to-noise ratio at electronic device 112-1 for the N time slots and/or a particular angle of arrival. More generally, the information for the time slot may be reported based at least in part on a performance metric. Next, access point 110-1 may select, based at least in part on the feedback, an antenna pattern associated with the time slot, such as the antenna pattern used when access point 110-1 provided or transmitted a predefined packet or frame in the time slot. This antenna pattern may be subsequently used by access point 110-1 when communicating with electronic device 112-1.

Moreover, in some embodiments, the information may specify a set of ranked time slots, such as time slot 4, time slot 1 and time slot 7. For example, the set of time slots may be ranked based at least in part on performance metrics at electronic device 112-1 that is associated with the N time slots, where a given performance metric for a given time slot may include: a signal-to-noise ratio, an angle of arrival or both.

In some embodiments, access point 110-1 may provide or transmit predefined packets or frames in the N time slots that are intended for or to two or more of electronic devices, such as electronic device 112-1 and 112-2. In response, in addition to the feedback, access point 110-1 may receive second feedback associated with or from electronic device 112-2, where the second feedback comprises information specifying at least a second time slot in the N time slots (such as time slot 2). Based at least in part on the second feedback, access point 110-1 may select a second antenna pattern associated with the second time slot, such as the second antenna pattern used when access point 110-1 provided or transmitted a predefined packet or frame in the second time slot. This second antenna pattern may be subsequently used by access point 110-1 when communicating with electronic device 112-2. Note that the second antenna pattern may be the same as or different from the antenna pattern.

Furthermore, in some embodiments, access point 110-1 may select, based at least in part on the feedback and the second feedback, a common antenna pattern for use when communicating jointly with electronic devices 112-1 and 112-2. For example, the common antenna pattern may be used when providing or transmitting a group frame intended for or to electronic devices 112-1 and 112-2.

Note that the feedback and the second feedback may include different feedback frames. Alternatively or additionally, the feedback and the second feedback may be conveyed in different sub-channels in a feedback frame.

Furthermore, access point 110-1 may serially provide polling information (such as poll frames) intended for or to electronic device 112-1 and second polling information intended for or to electronic device 112-2. Alternatively, access point 110-1 may provide a trigger frame intended for or to electronic device 112-1 and 112-2, where the feedback and the second feedback are received concurrently in different sub-channels in a feedback frame.

In this way, the communication technique may allow access points 110 and/or electronic devices 112 to determine one or more antenna patterns for use when communication with each other. Consequently, the communication technique may provide improved communication performance without unnecessary overhead or time delay. Therefore, the communication technique may improve the communication performance of access points 110 and/or electronic devices 112, and may facilitate an improved user experience when communicating information using access points 110 and electronic devices 112.

Figure 2:
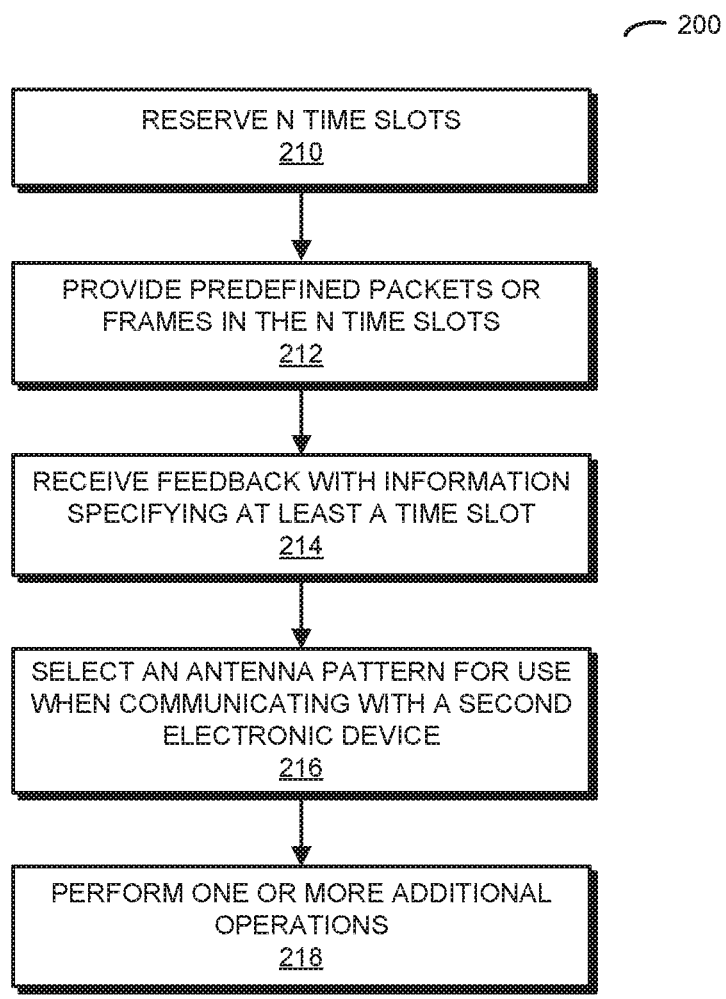
FIG. 2 is a flow diagram illustrating an example method for determining an antenna pattern in the system in FIG. 1 in accordance with an embodiment of the present disclosure.

We now describe embodiments of the method. FIG. 2 presents a flow diagram illustrating an example of a method 200 for determining an antenna pattern, which may be performed by an electronic device, such as one of access points 110 or one of electronic devices 112 in FIG. 1. During operation, the electronic device may reserve N time slots (operation 210) in a communication channel. For example, the predefined packets or frames may include NDPs. Note that the N time slots may be consecutive.

Then, the electronic device may provide predefined packets or frames in the N time slots (operation 212) that are intended for at least the second electronic device, where each time slot is associated with a different antenna pattern of an antenna in or associated with the electronic device. Note that the predefined packets or frames may be broadband, such as, e.g., having a bandwidth of 20, 40 or 80 MHz.

Moreover, the electronic device may receive feedback (operation 214) associated with the second electronic device, where the feedback includes information specifying at least a time slot in the N time slots. Furthermore, the time slot may have an extremum value of a performance metric. For example, the performance metric may include a signal-to-noise ratio. Note that the feedback may include a feedback frame.

Additionally, in some embodiments, the information may specify a set of ranked time slots. For example, the set of time slots may be ranked based at least in part on performance metrics associated with the time slots, where a given performance metric may include: a signal-to-noise ratio, an angle of arrival or both.

Next, the electronic device may select, based at least in part on the feedback, the antenna pattern (operation 216) associated with the time slot for use when communicating with the second electronic device.

In some embodiments, the electronic device optionally performs one or more additional operations (operation 218). For example, the electronic device may wirelessly communicate with a third electronic device. Then, during operation, the electronic device may: receive second feedback associated with the third electronic device, where the second feedback comprises information specifying at least a second time slot in the N time slots; and select, based at least in part on the second feedback, a second antenna pattern associated with the second time slot for use when communicating with the third electronic device.

Note that the feedback and the second feedback may include different feedback frames. Alternatively or additionally, the feedback and the second feedback may be conveyed in different sub-channels in a feedback frame.

Furthermore, the electronic device may serially provide polling information intended for the second electronic device and second polling information intended for the third electronic device. Alternatively, the electronic device may provide a trigger frame intended for the second electronic device and the third electronic device, where the feedback and the second feedback are received concurrently in different sub-channels in a feedback frame.

In some embodiments, the electronic device may select, based at least in part on the feedback and the second feedback, a common antenna pattern for use when communicating jointly with the second electronic device and the third electronic device.

Figure 3:
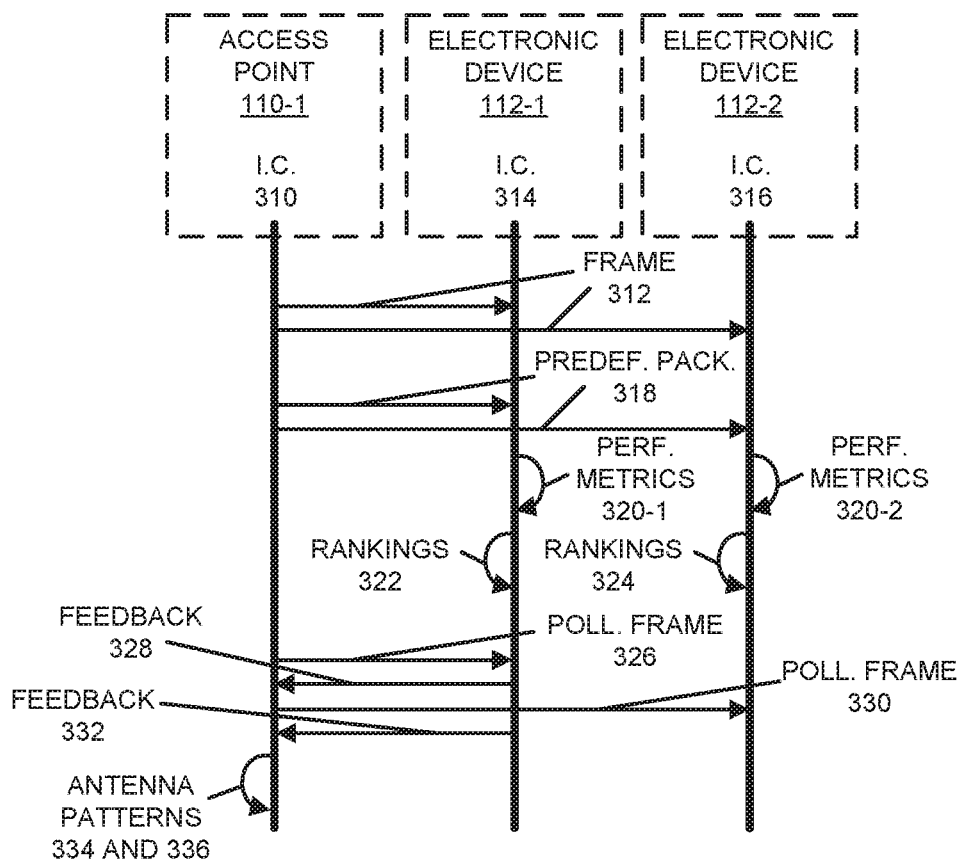
FIG. 3 is a drawing illustrating an example of communication among electronic devices in FIG. 1 in accordance with an embodiment of the present disclosure.

Embodiments of the communication technique are further illustrated in FIG. 3, which presents a drawing illustrating communication among access point 110-1 and electronic devices 112-1 and 112-2. Note that electronic devices 112 may be communicatively attached or connected to access point 110-1. For example, electronic devices 112 may be associated with access point 110-1. In the discussion of FIG. 3, as an illustration, the communication technique is performed by access point 110-1.

During the communication technique, interface circuit (I.C.) 310 in access point 110-1 may provide a frame 312 to electronic device 112-1 and/or 112-2 that reserves N time slots in a communication channel. For example, the frame 312 may be an antenna selection announcement or frame. Then, interface circuit 314 in electronic device 112-1 and/or interface circuit 316 in electronic device 112-2 may receive frame 312.

Moreover, interface circuit 310 may predefined packets 318 (or frames) in the N time slots to electronic device 112-1 and/or 112-2, where each time slot is associated with a different antenna pattern of an antenna in or associated with access point 110-1. Next, interface circuit 314 and/or interface circuit 316 may receive predefined packets 318.

Furthermore, interface circuits 314 and/or 316 may, respectively, determine performance metrics 320 corresponding to predefined packets 318. For example, performance metrics 320 may include one or more of: signal-to-noise ratios, angles of arrival, and/or another performance metric associated with the communication of predefined packets 318. Based at least in part on performance metrics 320, interface circuits 314 and/or 316 may, respectively, determine rankings 322 and/or 324 of at least some of the time slots. For example, a given ranking may order at least some of the time slots from the largest signal-to-noise ratio (or performance metric) to the smallest. Alternatively, a given ranking may include at least a subset of the time slots having the top-M (where M is an integer) signal-to-noise ratios (or performance metrics).

Additionally, interface circuits 314 and/or 316 may provide, respectively, feedback 328 and/or 332 to access point 110-1. The feedback from a given electronic device may include information specifying at least a time slot in the N time slots. More generally, the information may specify a given ranking of at least some of the N time slots.

Note that feedback 328 and 332 may be included in separate feedback frames. Alternatively, feedback 328 and 332 may be included in a common feedback frame, such as in different sub-channels in the common feedback frame.

In some embodiments, interface circuit 310 optionally provide polling information (such as polling frames 326 and/or 330) to electronic devices 112-1 and/or 112-2 to request or solicit feedback 328 and/or 332. In these embodiments, interface circuit 314 and/or 316 may provide feedback 328 and/or 332 in response to polling frames 326 and/or 330. Alternatively, in embodiments where feedback 328 and 332 are included in a common feedback frame, interface circuit 310 may request or solicit feedback 328 and 332 by first providing a trigger frame (not shown) to interface circuits 314 and 316.

After receiving feedback 328 and/or 332, interface circuit 310 may, respectively, select antenna patterns 334 and/or 336 to use when communicating with electronic devices 112-1 and/or 112-2 based at least in part on feedback 328 and/or 332. Alternatively, in some embodiments, interface circuit 310 may select, based at least in part on feedback 328 and 332, a common antenna pattern (not shown) for use when communicating jointly with electronic devices 112-1 and 112-2. For example, the common antenna pattern may be selected based at least in part on the highest-ranked time slots that overlap or jointly occur in rankings 322 and 324.

While FIG. 3 illustrates particular operations involving unilateral or bilateral communication, in general each of the operations illustrated in FIG. 3 may involve unilateral or bilateral communication.

Figure 4:
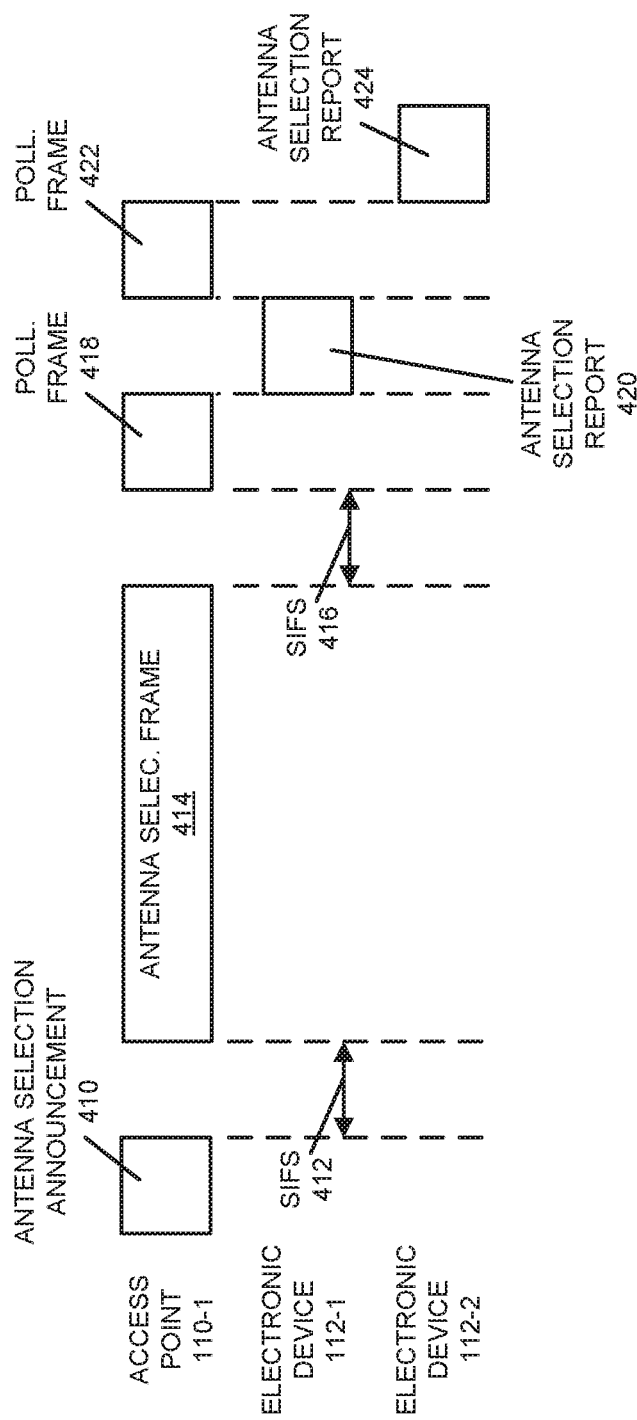
FIG. 4 is a timing diagram illustrating an example of communication among electronic devices in FIG. 1 in accordance with an embodiment of the present disclosure.

FIG. 4 presents a timing diagram illustrating an example of communication among access point 110-1 and electronic devices 112-1 and 112-2. Notably, access point 110-1 may provide an antenna selection announcement 410 to reserve N time slots. Then, after a short interframe space (SIFS) 412, access point 110-1 may provide an antenna selection frame 414 with predefined packets or frames (such as NDPs) in the N time slots to electronic devices 112-1 and 112-2.

Next, after a SIFS 416, access point 110-1 may optionally provide a polling frame 418 to electronic device 112-1. In response, electronic device 112-1 may provide an antenna selection report 420 with feedback, including information that specifies at least one and, more generally, a ranking of at least some of the time slots. As discussed previously, access point 110-1 may use this information to select an antenna pattern to use when communicating with electronic device 112-1.

Furthermore, access point 110-1 may optionally provide a polling frame 422 to electronic device 112-2. In response, electronic device 112-2 may provide an antenna selection report 424 with feedback, including information that specifies at least one and, more generally, a ranking of at least some of the time slots. As discussed previously, access point 110-1 may use this information to select an antenna pattern to use when communicating with electronic device 112-2.

In some embodiments of the communication technique, an access point sends an antenna selection announcement. This antenna selection announcement may inform clients of the access point about an antenna selection frame. Notably, the antenna selection announcement may include a duration (such as a number time slots N) of the antenna selection frame.

Then, following a SIFS, the access point may send the antenna selection frame. This frame may include N NDP frames. Notably, for each time slot, a null data packet frame may be sent using a different antenna pattern.

When each client receives the whole antenna selection frame, it may compare the signal-to-noise ratio of each time-slot, and may select or choose one or more of the associated antenna patterns having the best signal-to-noise ratios. Next, the clients may store the time-slot numbers corresponding to the selected antenna patterns. Note that the clients may receive the antenna selection frame using an omnidirectional antenna pattern.

Moreover, after a SIFS, a first client may send an antenna selection report frame, which includes or reports the time-slot numbers selected by the first client.

Furthermore, the access point may send an antenna selection report poll frame. In response, a second client may send an antenna selection report frame, which includes or reports the time-slot numbers selected by the second client.

The operations of the access point sending an antenna selection report poll frame and a client responding with an antenna selection report frame may be repeated for the remaining clients of the access point.

After the access point has received the antenna selection report frame(s), the access point may know the antenna pattern(s) to use with each client.

Note that the communication technique may be used with multi-user multiple input multiple output (MU-MIMO) and/or orthogonal frequency-division multiple access (OFDMA).

Figure 5:
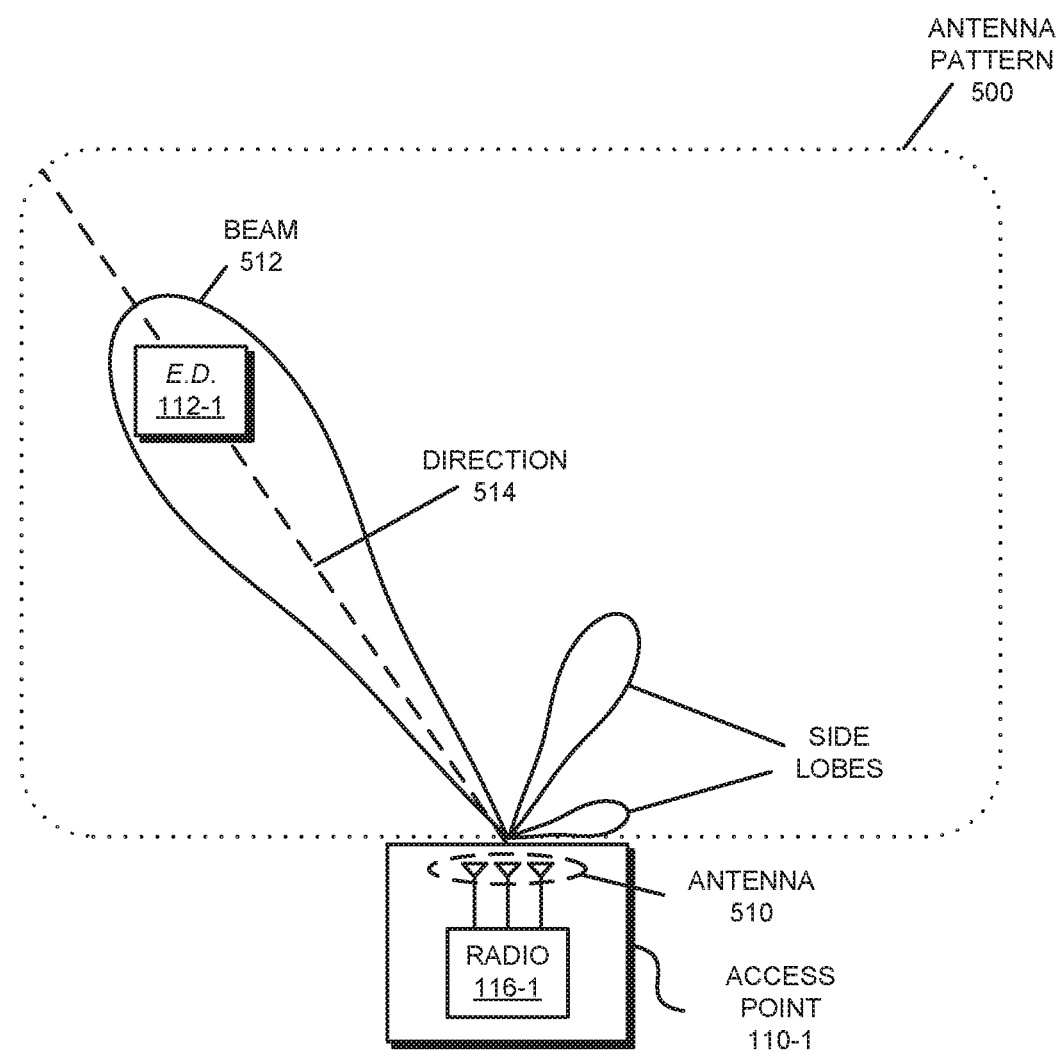
FIG. 5 is a drawing illustrating an example of an antenna pattern of an antenna in one of the electronic devices in the system in FIG. 1 in accordance with an embodiment of the present disclosure.

FIG. 5 presents a drawing illustrating an antenna pattern 500 of an antenna in access point 110-1. Alternatively, in some embodiments, antenna pattern 500 is of an antenna in one of electronic devices 112 in FIG. 1.

Notably, access point 110-1 may configure antenna elements in antenna 510 to select a direction 514 of a primary beam 512 in antenna pattern 500. This selective directionality may improve the sensitivity when access point 110-1 transmits or receives a frame or a packet.

For example, an interface circuit in radio 116-1 may provide control signals or settings that adapt or change antenna pattern 500 of antenna 510. In some embodiments, the control signals or settings may independently and selectively electrically couple pattern shapers or antenna elements (such as reflectors) in antenna 510 to ground in order to steer antenna pattern 500 in different directions (such as direction 514). Thus, if one or more antennas elements in antenna 510 include N antenna pattern shapers, antenna 510 may have $2^N$ different antenna pattern configurations. More generally, a given antenna pattern may include amplitudes and/or phases of signals that specify a direction of the main or primary lobe or beam 512 of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam 512) that directs gain in direction 514 of, e.g., electronic device (E.D.) 112-1 that is of interest and/or one or more local minima that reduce gain in the direction of other electronic devices that are not of interest. More generally, antenna pattern 500 may have N beams at locations of electronic devices (such as electronic device 112-1) that will transmit to or that will receive from access point 110-1 in the subsequent time interval and/or M exclusion zones at the locations of electronic devices that will not transmit to or receive from access point 110-1 in the subsequent time interval, where N and M are integers. For example, antenna 510 may include M+1 antenna elements and there may be M exclusion zones. In this way, the given antenna pattern may be selected so that communication that is undesirable (such as with the other electronic devices) is avoided to reduce or eliminate adverse effects (such as interference or crosstalk) and to increase the sensitivity of transmissions to or from electronic device 112-1.

In some embodiments, antenna pattern 500 is used when transmitting and/or receiving. While in some embodiments antenna pattern 500 may be omnidirectional, in other embodiments antenna pattern 500 may have increased directionality relative to an omnidirectional antenna pattern (e.g., a primary lobe or beam 512 of antenna pattern 500 may be directed so that the transmitted energy to or the received energy from, e.g., electronic device 112-1 in increased, which may increase the communication performance (such as by improving one or more performance metrics).

We now describe another embodiment of the communication technique. These embodiments may determine one or more antenna patterns using a very high throughput (VHT) compressed beamforming report (specified in IEEE 802.11ac and IEEE 802.11ax) with information that specifies the signal-to-noise ratio, averaged over all subcarriers, of each space-time stream at a recipient electronic device, such as at one of electronic devices 112 in FIG. 1. Thus, information determined during sounding may be used to determine or select the one or more antenna patterns.

Figure 6:
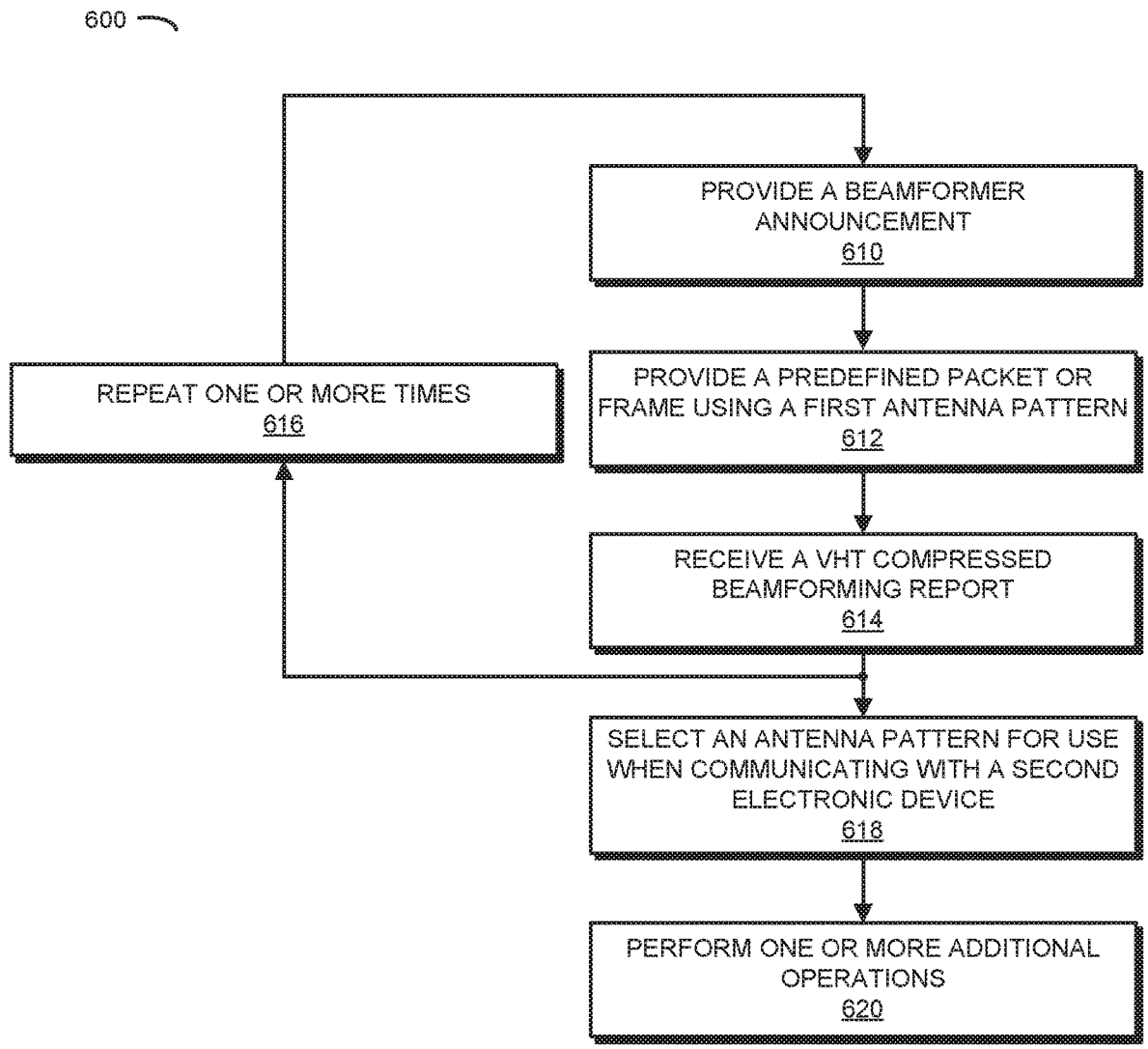
FIG. 6 is a flow diagram illustrating an example method for determining an antenna pattern in the system in FIG. 1 in accordance with an embodiment of the present disclosure.

FIG. 6 presents a flow diagram illustrating an example of a method 600 for determining an antenna pattern, which may be performed by an electronic device, such as one of access points 110 or one of electronic devices 112 in FIG. 1. During operation, the electronic device may provide a beamformer announcement (operation 610) intended for or to at least a second electronic device. For example, the electronic device may provide an NDP announcement.

Then, the electronic device may provide a predefined packet or frame intended for or to a second electronic device using a first antenna pattern (operation 612). For example, the predefined packet or frame may include an NDP. Note that the predefined packet or frame may be broadband, such as, e.g., having a bandwidth of 20, 40 or 80 MHz.

Moreover, the electronic device may receive a VHT compressed beamforming report (operation 614) associated with or from the second electronic device. Note that the VHT compressed beamforming report may include one or more performance metrics (such as the signal-to-noise ratio, the angle of arrival, etc.), averaged over all subcarrier, for each space-time stream at the second electronic device.

Next, the electronic device may repeat (operation 616) operations 612 and 614 one or more times using one or more other or different antenna patterns.

Furthermore, the electronic device may select, based on the one or more performance metrics for each of the antenna patterns, an antenna pattern (operation 618) for use when communicating with the second electronic device (such as when transmitting and/or receiving).

In some embodiments, the electronic device may optionally perform one or more additional operations (operation 620). For example, in embodiments in which multi-user beamforming is performed, the electronic device may also provide the beamformer announcement (operation 610) and the predefined packet or frame (operation 612) to, e.g., at least a third electronic device. Then, after the electronic device receives the VHT compressed beamforming report (operation 614) associated with or from the second electronic device, the electronic device may: provide a poll frame (such as a beamforming report poll or BRP frame) to the third electronic device; and receive a VHT compressed beamforming report associated with or from the third electronic device. Next, instead of selecting the antenna pattern (operation 618) for use with the second electronic device, the electronic device may use the performance metrics in the VHT compressed beamforming reports to select a common antenna pattern for use when communicating with the second electronic device and the third antenna pattern.

While the preceding discussion illustrated method 600 using serial polling recipient electronic devices, in other embodiments VHT compressed beamforming reports may be provided concurrently. For example, the electronic device may provide a trigger frame, and the recipient electronic devices may provide the VHT compressed beamforming reports in different sub-channels in a common frame.

In some embodiments of methods 200 (FIG. 2) and/or 600, there may be additional or fewer operations. Moreover, there may be one or more different operations. Furthermore, the order of the operations may be changed, and/or two or more operations may be combined into a single operation.

Figure 7:
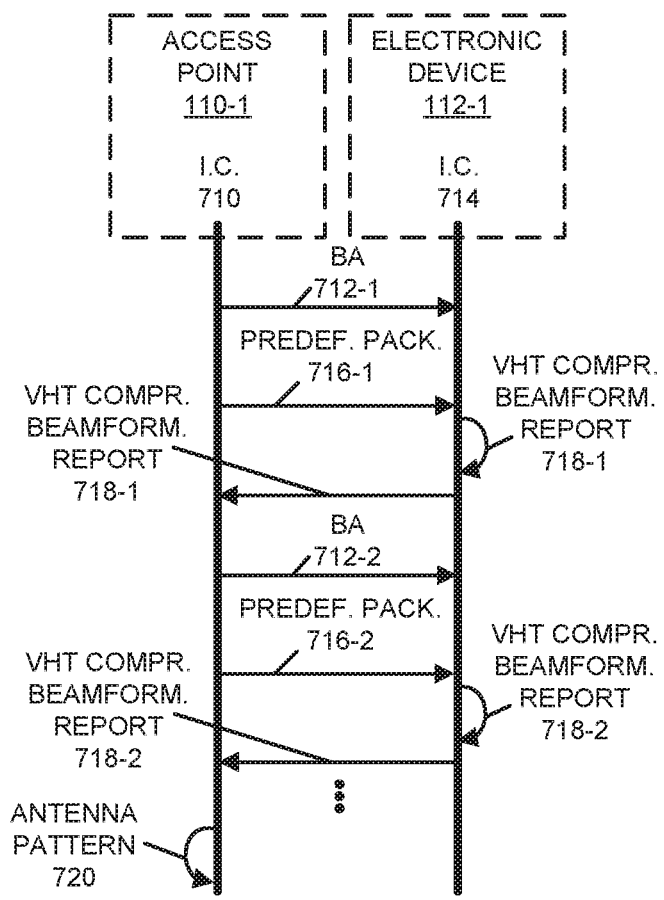
FIG. 7 is a drawing illustrating an example of communication among electronic devices in FIG. 1 in accordance with an embodiment of the present disclosure.

Embodiments of the communication technique are further illustrated in FIG. 7, which presents a drawing illustrating communication among access point 110-1 and electronic device 112-1. Note that electronic device 112-1 may be communicatively attached or connected to access point 110-1. For example, electronic device 112-1 may be associated with access point 110-1. In the discussion of FIG. 7, as an illustration, the communication technique is performed by access point 110-1.

During the communication technique, interface circuit (I.C.) 710 in access point 110-1 may provide a beamformer announcement (BA) 712-1 to electronic device 112-1. This beamformer announcement 712-1 may be received by interface circuit 714 in electronic device 112-1.

Then, interface circuit 710 may provide a predefined packet or frame 716-1 to electronic device 112-1 using a first antenna pattern. After receiving the predefined packet or frame 716-1, interface circuit 714 may determine a VHT compressed beamforming report 718-1. Moreover, interface circuit 714 may provide the VHT compressed beamforming report 718-1 to access point 110-1.

Next, interface circuit 710 may repeat, one or more times, providing instances of the beamformer announcement (BA) 712 and providing instances of the predefined packet or frame 716 using different antenna patterns. In response, interface circuit 714 may determine instances of associated VHT compressed beamforming reports 718, and may provide these VHT compressed beamforming reports 718 to access point 110-1.

After receiving the VHT compressed beamforming reports 718, interface circuit 710 may select, based on the one or more performance metrics for each of the antenna patterns included in the VHT compressed beamforming reports, an antenna pattern 720 for use when communicating with electronic device 112-1.

While FIG. 7 illustrates particular operations involving unilateral or bilateral communication, in general each of the operations illustrated in FIG. 7 may involve unilateral or bilateral communication.

Figure 8:
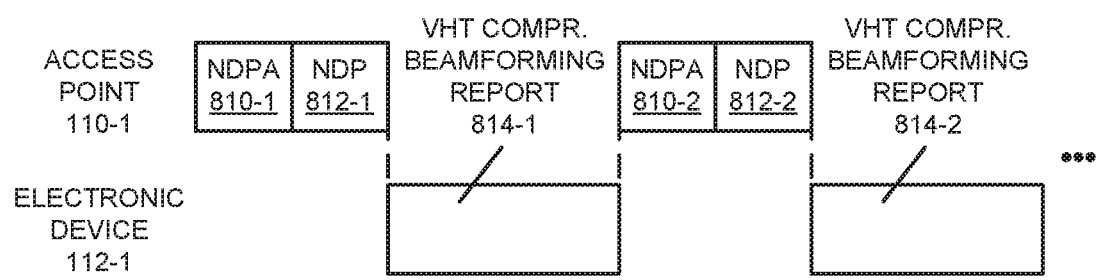
FIG. 8 is a timing diagram illustrating an example of communication among electronic devices in FIG. 1 in accordance with an embodiment of the present disclosure.

FIG. 8 presents a timing diagram illustrating an example of communication among access point 110-1 and electronic device 112-1. Notably, access point 110-1 may provide an NDP announcement (NDPA) 810-1. Then, access point 110-1 may provide an NDP 812-1 using a first antenna pattern.

Moreover, after determining a VHT compressed beamforming report 814-1 in response to receiving NDP 812-1, electronic device 112-1 may provide the VHT compressed beamforming report 814-1 to access point 110-1.

Next, access point 110-1 may repeat, one or more times, providing instances of NDP announcements 810 and providing instances of NDP 812 using different antenna patterns, and electronic device 112-1 may determine and provide instances of associated VHT compressed beamforming reports 814 to access point 110-1. For example, access point 110-1 may provide an NDP announcement 810-2 and may provide an NDP 812-2 using a second antenna pattern. In response to receiving NDP 812-2, electronic device 112-1 may determine a VHT compressed beamforming report 814-2 and may provide the VHT compressed beamforming report 814-2 to access point 110-1.

As discussed previously, access point 110-1 may use the performance-metric information in VHT compressed beamforming reports 814 to select an antenna pattern to use when communicating with electronic device 112-1.

In some embodiments of the communication technique, signal-to-noise information in VHT compressed beamforming reports is used to select an antenna pattern for use when communicating with an electronic device. Notably, during single-user beamforming, an access point (and, more generally, a beamformer) may send an NDP announcement. Then, the access point may send an NDP using a first antenna pattern. In response, an electronic device (and, more generally, a beamformee) may determine and may send a VHT Compressed Beamforming Report to the access point. The access point may repeat, one or more times, sending NDPs using different antenna patterns, and the electronic device may respond by determining and sending associated VHT Compressed Beamforming Report to the access point. Using the performance-metric information in the VHT Compressed Beamforming Reports, the access point may select an antenna pattern to use when communicating with the electronic device. For example, the selected antenna pattern may have a maximum or largest signal-to-noise ratio in the VHT Compressed Beamforming Reports.

Alternatively, during multi-user beamforming, an access point (and, more generally, a beamformer) may send an NDP announcement. Then, the access point may send an NDP using a first antenna pattern. In response, a first electronic device (and, more generally, a beamformee) may determine and may send a VHT Compressed Beamforming Report to the access point. Moreover, the access point may send a BRP frame to a second electronic device. In response, the second electronic device (and, more generally, a second beamformee) may determine and may send a second VHT Compressed Beamforming Report to the access point. Next, the access point may send a BRP frame to a third electronic device. In response, the third electronic device (and, more generally, a third beamformee) may determine and may send a third VHT Compressed Beamforming Report to the access point. The polling and reporting operations may be repeated until all the electronic devices have reported. Furthermore, the preceding operations may be repeated one or more times for different antenna patterns. Using the performance-metric information in the VHT Compressed Beamforming Reports, the access point may select an antenna pattern to use when communicating with the electronic devices, such as during multi-user beamforming. For example, the selected antenna pattern may have a maximum or largest average or mean signal-to-noise ratio in the VHT Compressed Beamforming Reports.

We now describe embodiments of an electronic device, which may perform at least some of the operations in the communication technique. For example, the electronic device may include one of access points 110 or electronic devices 112 in FIG. 1. FIG. 9 presents a block diagram illustrating an electronic device 900 in accordance with some embodiments. This electronic device includes processing subsystem 910, memory subsystem 912, and networking subsystem 914. Processing subsystem 910 includes one or more devices configured to perform computational operations. For example, processing subsystem 910 can include one or more microprocessors, ASICs, microcontrollers, programmable-logic devices, graphics processing units (GPUs) and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program instructions 922 or operating system 924), which may be executed by processing subsystem 910. Note that the one or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more antennas 920 (or antenna elements). (While FIG. 9 includes one or more antennas 920, in some embodiments electronic device 900 includes one or more nodes, such as nodes 908, e.g., a pad, which can be coupled to the one or more antennas 920. Thus, electronic device 900 may or may not include the one or more antennas 920. Note that nodes 908 may include one or more input nodes and/or one or more output nodes.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Note that a transmit or receive antenna pattern (or antenna radiation pattern) of electronic device 900 may be adapted or changed using pattern shapers (such as reflectors) in one or more antennas 920 (or antenna elements), which can be independently and selectively electrically coupled to ground to steer the transmit antenna pattern in different directions. Thus, if one or more antennas 920 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 900 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a subnotebook/netbook, a server, a tablet computer, a smartphone, a cellular telephone, a smartwatch, a consumer-electronic device, a portable computing device, a wearable device, an access point, a transceiver, an eNodeB, a router, a switch, communication equipment, a controller, test equipment, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. The integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 922, operating system 924 (such as a driver for interface circuit 918) or in firmware in interface circuit 918. Alternatively or additionally, at least some of the operations in the communication technique may be implemented in a physical layer, such as hardware in interface circuit 918.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

While the preceding discussion illustrated the communication techniques using communication in one or more particular bands of frequencies, one or more other bands of frequencies may be used, such as bands of frequencies corresponding to Wi-Fi, LTE and/or Citizens Broadband Radio Service (CBRS). For example, the bands of frequencies may include: a band of frequencies between 3.55 and 3.7 GHz, a band of frequencies near or including 2.4 GHz, a band of frequencies near or including 3.6 GHz, a band of frequencies near or including 4.9 GHz, a band of frequencies near or including 5 GHz, a band of frequencies near or including 5.9 GHz or 6 GHz, a band of frequencies near 60 GHz and/or another band of frequencies. Note that the bands of frequencies may include one or more bands of frequencies.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna; and
   an interface circuit, coupled to the antenna, configured to wirelessly communicate with a second electronic device, wherein the electronic device is configured to perform operations comprising:
   provide, from the interface circuit, a beamformer announcement addressed to the second electronic device;
   provide, from the interface circuit and using a first antenna pattern, an instance of a predefined frame addressed to the second electronic device;
   receive, at the interface circuit, an instance of a beamforming report associated with the second electronic device, wherein the instance of the beamforming report comprises one or more performance metrics averaged over multiple subcarriers in a band of frequencies, wherein a given performance metric is associated with a given space-time stream at the second electronic device;
   repeat, one or more times, the providing of the instance of the predefined frame addressed to the second electronic device and the receiving of the instance of the beamforming report associated with the second electronic device, wherein a given repeat of the providing of the instance of the beamforming report uses a different antenna pattern than the first antenna pattern or in other repeats of the providing of the instance of the beamforming report addressed to the second electronic device; and
   select, based at least in part on one or more instances of the beamforming report for different antenna patterns, a second antenna pattern for use when communicating with the second electronic device.

2. The electronic device of claim 1, wherein the beamformer announcement comprises a null data packet (NDP) announcement.

3. The electronic device of claim 1, wherein the instance of the predefined frame has a bandwidth that encompasses the multiple subcarriers in the band of frequencies.

4. The electronic device of claim 1, wherein the instance of the beamforming report comprises a very high throughput (VHT) compressed beamforming report.

5. The electronic device of claim 1, wherein the one or more performance metrics comprise: a signal-to-noise ratio, or an angle of arrival.

6. The electronic device of claim 1, wherein the second antenna pattern is used when transmitting a first packet or frame addressed to the second electronic device, receiving a second packet or frame associated with the second electronic device, or both.

7. The electronic device of claim 1, wherein the instance of the predefined frame comprises a null data packet (NDP).

8. The electronic device of claim 1, wherein the interface circuit is configured to wirelessly communicate with a third electronic device; and
   wherein the electronic device is configured to:
   provide, from the interface circuit, the beamformer announcement addressed to the third electronic device;
   provide, from the interface circuit and using the first antenna pattern, the instance of the predefined frame addressed to the third electronic device;
   receive, at the interface circuit, the instance of the beamforming report associated with the third electronic device, wherein the instance of the beamforming report comprises one or more performance metrics averaged over the multiple subcarriers in the band of frequencies, wherein the given performance metric is associated with the given space-time stream at the third electronic device; and
   repeat, one or more times, the providing of the instance of the predefined frame addressed to the third electronic device and the receiving of the instance of the beamforming report associated with the third electronic device, wherein the given repeat of the providing of the instance of the beamforming report uses the different antenna pattern than the first antenna pattern or in the other repeats of the providing of the instance of the beamforming report addressed to the third electronic device.

9. The electronic device of claim 8, wherein the instances of the beamform report associated with the second electronic device are included in different frames than the instances of the beamform report associated with the third electronic device.

10. The electronic device of claim 8, wherein at least one of the instances of the beamform report associated with the second electronic device and at least one of the instances of the beamform report associated with the third electronic device are conveyed in different sub-channels in a feedback frame.

11. The electronic device of claim 8, wherein the electronic device is configured to serially provide, from the interface circuit, polling information intended for the second electronic device and second polling information intended for the third electronic device; and
    wherein the instances of the beamform report associated with the second electronic device are in response to the polling information and the instances of the beamform report associated with the third electronic device are in response to the second polling information.

12. The electronic device of claim 8, wherein the electronic device is configured to provide, from the interface circuit, a trigger frame intended for the second electronic device and the third electronic device; and
    wherein at least one of the instances of the beamform report associated with the second electronic device and at least one of the instances of the beamform report associated with the third electronic device are received concurrently in different sub-channels in a feedback frame and in response to the trigger frame.

13. The electronic device of claim 8, wherein the electronic device is configured to select, based at least in part on the instances of the beamforming report for the different antenna patterns and associated with the second electronic device and the instances of the beamforming report for the different antenna patterns and associated with the third electronic device, a common antenna pattern for use when communicating jointly with the second electronic device and the third electronic device.

14. A non-transitory computer-readable storage medium for use in conjunction with an electronic device, the computer-readable storage medium storing program instructions, wherein, when executed by the electronic device, the program instructions cause the electronic device to perform operations comprising:
    providing, from an interface circuit, a beamformer announcement addressed to a second electronic device;
    providing, from the interface circuit and using a first antenna pattern, an instance of a predefined frame addressed to the second electronic device;
    receiving, at the interface circuit, an instance of a beamforming report associated with the second electronic device, wherein the instance of the beamforming report comprises one or more performance metrics averaged over multiple subcarriers in a band of frequencies, wherein a given performance metric is associated with a given space-time stream at the second electronic device;
    repeating, one or more times, the providing of the instance of the predefined frame addressed to the second electronic device and the receiving of the instance of the beamforming report associated with the second electronic device, wherein a given repeat of the providing of the instance of the beamforming report uses a different antenna pattern than the first antenna pattern or in other repeats of the providing of the instance of the beamforming report addressed to the second electronic device; and
    selecting, based at least in part on one or more instances of the beamforming report for different antenna patterns, a second antenna pattern for use when communicating with the second electronic device.

15. The non-transitory computer-readable storage medium of claim 14, wherein the beamformer announcement comprises a null data packet (NDP) announcement.

16. The non-transitory computer-readable storage medium of claim 14, wherein the instance of the beamforming report comprises a very high throughput (VHT) compressed beamforming report.

17. The non-transitory computer-readable storage medium of claim 14, wherein the operations comprise:
    providing, from the interface circuit, the beamformer announcement addressed to the third electronic device;
    providing, from the interface circuit and using the first antenna pattern, the instance of the predefined frame addressed to the third electronic device;
    receiving, at the interface circuit, the instance of the beamforming report associated with the third electronic device, wherein the instance of the beamforming report comprises one or more performance metrics averaged over the multiple subcarriers in the band of frequencies, wherein the given performance metric is associated with the given space-time stream at the third electronic device; and
    repeating, one or more times, the providing of the instance of the predefined frame addressed to the third electronic device and the receiving of the instance of the beamforming report associated with the third electronic device, wherein the given repeat of the providing of the instance of the beamforming report uses the different antenna pattern than the first antenna pattern or in the other repeats of the providing of the instance of the beamforming report addressed to the third electronic device.

18. The non-transitory computer-readable storage medium of claim 14, wherein the instances of the beamform report associated with the second electronic device are included in different frames than the instances of the beamform report associated with the third electronic device.

19. The non-transitory computer-readable storage medium of claim 14, wherein at least one of the instances of the beamform report associated with the second electronic device and at least one of the instances of the beamform report associated with the third electronic device are conveyed in different sub-channels in a feedback frame.

20. A method for selecting a second antenna pattern, comprising:
    by an electronic device:
    providing, from an interface circuit, a beamformer announcement addressed to a second electronic device;
    providing, from the interface circuit and using a first antenna pattern, an instance of a predefined frame addressed to the second electronic device;
    receiving, at the interface circuit, an instance of a beamforming report associated with the second electronic device, wherein the instance of the beamforming report comprises one or more performance metrics averaged over multiple subcarriers in a band of frequencies, wherein a given performance metric is associated with a given space-time stream at the second electronic device;
    repeating, one or more times, the providing of the instance of the predefined frame addressed to the second electronic device and the receiving of the instance of the beamforming report associated with the second electronic device, wherein a given repeat of the providing of the instance of the beamforming report uses a different antenna pattern than the first antenna pattern or in other repeats of the providing of the instance of the beamforming report addressed to the second electronic device; and selecting, based at least in part on one or more instances of the beamforming report for different antenna patterns, a second antenna pattern for use when communicating with the second electronic device.

\* \* \* \* \*